United States Patent
Li et al.

(10) Patent No.: US 12,340,170 B1
(45) Date of Patent: Jun. 24, 2025

(54) METHOD FOR PROCESSING COMPLEX DATA

(71) Applicant: Shenzhen Anke Baiteng Technology Co., LTD, Shenzhen (CN)

(72) Inventors: Shian Li, Shenzhen (CN); Yubin Li, Shenzhen (CN); Xiang Long, Shenzhen (CN); Qiufang He, Shenzhen (CN)

(73) Assignee: Shenzhen Anke Baiteng Technology Co., LTD, Shenzhen (CN)

( * ) Notice: Subject to any disclaimer, the term of this patent is extended or adjusted under 35 U.S.C. 154(b) by 0 days.

(21) Appl. No.: 19/021,755

(22) Filed: Jan. 15, 2025

(30) Foreign Application Priority Data

Apr. 10, 2024 (CN) .......................... 202410424687.5

(51) Int. Cl.
*G06F 40/186* (2020.01)
(52) U.S. Cl.
CPC ................................. *G06F 40/186* (2020.01)
(58) Field of Classification Search
CPC ...................................................... G06F 40/186
See application file for complete search history.

(56) References Cited

U.S. PATENT DOCUMENTS

| | | | |
|---|---|---|---|
| 11,914,949 B2* | 2/2024 | Kaufman | G06F 40/103 |
| 2008/0040340 A1* | 2/2008 | Varadarajan | G06F 40/186 |
| | | | 707/999.005 |
| 2016/0012145 A1 | 1/2016 | Benjamin | |

FOREIGN PATENT DOCUMENTS

| | | | | |
|---|---|---|---|---|
| CN | 114118042 A | * | 3/2022 | G06F 16/29 |
| CN | 116738954 A | | 9/2023 | |
| CN | 111708804 B | * | 3/2024 | G06F 16/2445 |
| CN | 117763200 A | | 3/2024 | |
| CN | 114166947 B | * | 6/2024 | G01N 29/069 |

* cited by examiner

*Primary Examiner* — Hassan Mrabi
(74) *Attorney, Agent, or Firm* — Nitin Kaushik

(57) ABSTRACT

Disclosed in the present application is a method for processing complex data, which relates to the technical field of data processing. The method includes: generating a query instruction set by execution parameters of a target screening template through a data processing model; transmitting the query instruction set to a data processing engine for the data processing engine to obtain data from each connected target data source based on the query instruction set; and after the data is standardized through the data processing model, importing the data into a target collection template for analysis. A worker only needs to set the corresponding collection template and screening template according to a research scenario, and there is no need to develop a software according to the research scenario, which reduces preliminary preparation time and improves efficiency of data processing.

9 Claims, 6 Drawing Sheets

FIG. 2

Custom indicator

FIG. 3

METHOD FOR PROCESSING COMPLEX DATA

CROSS-REFERENCE TO RELATED APPLICATIONS

The application claims priority to Chinese patent application No. 2024104246875, filed on Apr. 10, 2024, the entire contents of which are incorporated herein by reference.

TECHNICAL FIELD

This application relates to the technical field of data processing and, more specifically, to a method for processing complex data.

BACKGROUND

In various research scenarios based on the real world, there are often situations involving analysis of a large amount of data. For example, in research scenarios such as a treatment effect research and risk indicator monitoring, it may be necessary to carry out Meta analysis or indicator monitoring on a plurality of data sets and a plurality of indicators. During the analysis or the monitoring, required research data may be stored in different data sources, so it is necessary to extract the required research data from different data sources. In addition, different research scenarios require different research data.

Data needed for research or monitoring is stored in a plurality of different data sources, which makes data storage complicated. When data processing or data analysis is required, it is necessary to develop a specific analysis task separately for the research data in each data source, and then summarize analysis results of the research data in different data sources to obtain a final analysis result. However, the existing methods for processing complex data have high investment and long time in a development of data analysis and processing tasks, and the efficiency of data processing is low.

SUMMARY

In view of this, this application provides a method for processing complex data to solve the problems that the existing methods for processing complex data require high investment and long time in the development of data analysis and processing tasks, and the efficiency of data processing is low.

In order to achieve the above objectives, proposed schemes are as follows:

A method for processing complex data, comprising:
generating the target collection template and the target screening template for the current data processing task based on a target data dictionary and the execution parameters input by the user, wherein the target data dictionary is an industry data dictionary imported by the user or a data dictionary generated by the pre-trained data processing model through data organization of unstructured data in a data set imported by the user;
determining whether execution parameters of the target processing template pair need to be modified;
if not, generating a query instruction set based on the execution parameters of the target screening template;
transmitting the query instruction set to a data processing engine, so that the data processing engine obtains data from each target data source based on the query instruction set to acquire an initial data set, wherein the query instruction set comprises at least one query instruction;
standardizing the data in the initial data set through a data processing model to acquire a standard data set; and
importing the data in the standard data set into the target collection template to acquire a target data set.

Preferably, a process of generating the target collection template and the target screening template by the user according to the current data processing task comprises:
generating the target collection template and the target screening template for the current data processing task based on a target data dictionary and the execution parameters input by the user, wherein the target data dictionary is an industry data dictionary imported by the user or a data dictionary generated by the pre-trained data processing model through data organization of unstructured data in a data set imported by the user.

Preferably, the method further comprises:
storing the generated target collection template and target screening template respectively in the collection template library and the screening template library for export and copy by the user for subsequent use.

Preferably, after determining whether execution parameters of the target processing template pair need to be modified, the method further comprises:
if so, displaying the execution parameters of the target processing template pair; and
in response to an operation of the user, obtaining the modified execution parameters so as to acquire an updated target processing template pair.

Preferably, after importing the data in the standard data set into the target collection template, the method further comprises:
determining whether the data in the target data set requires manual confirmation;
if so, displaying the target data set; and
in response to an operation of selecting data by the user, deleting data not selected by the user to acquire a target data set confirmed by the user.

Preferably, the method further comprises:
adding one to the current number of executions of the current data processing task to acquire the updated current number of executions.

Preferably, the method further comprises:
based on the execution parameters of the target processing template pair, determining whether the current data processing task needs to be executed periodically;
if so, obtaining an execution period of the target processing template pair;
calculating target time of a next execution of the current data processing task based on the execution cycle and the current time; and
storing the current data processing task as a scheduled task for an execution of the step of generating the query instruction set based on the execution parameters of the target screening template at the target time.

Preferably, the method further comprises:
determining whether current data processing requires data analysis;
if so, analyzing the data in the target data set, and generating a data analysis report according to a target analysis template pre-set by the user to acquire the data analysis report, wherein the target analysis template is an analysis template customized by the user according to the current data processing task, or an analysis template selected by the user from the analysis template library according to the current data processing task.

Preferably, the method further comprises:
generating an operation report that comprises at least one of the target data set and the analysis report; and
storing the operation report.

Preferably, after generating the operation report, the method further comprises:
determining whether to export the operation report;
if the operation report is exported, determining whether the user has an export permission; and
if the user has the export permission, exporting the operation report.

From the above technical schemes, it can be seen that the method for processing complex data provided in this application comprises generating a query instruction set based on the execution parameters of the target screening template; transmitting the query instruction set to the data processing engine so that the data processing engine obtains data from each target data source based on the query instruction set to acquire the initial data set; standardizing the data in the initial data set through the data processing model to acquire the standard data set; and importing the data from the standard data set into the target collection template to acquire the target data set. In the method for processing complex data in this application, the data processing engine can be connected with each data source; the data processing engine obtains, from each target data source, the data that satisfies a screening condition of the target screening template based on the query instruction set; and a pre-trained data processing model can standardize data from different target data sources and import the standardized data into a collection template A worker only needs to set the corresponding collection template and screening template according to a research scenario, and there is no need for the worker to develop a software according to the research scenario, which reduces preliminary preparation time, decreases a data processing cost and improves the efficiency of the data processing. In addition, for similar data processing tasks, the worker only needs to copy the template in the template library and fine-tune it. Multiple times of reuse of the template can further reduce the cost of data processing tasks and improve the efficiency of the data processing.

BRIEF DESCRIPTION OF DRAWINGS

In order to more clearly explain the technical schemes in embodiments of the present application or in the prior art, the following is a brief introduction of the drawings required to be used in the description of the embodiments or the prior art. Obviously, the drawings described below are only the embodiments of the present application. A person skilled in the art may also obtain other drawings based on the drawings provided without creative labor.

FIG. 2 is a design schematic diagram of a collection template provided in an embodiment of this application;

FIG. 3 is a design schematic diagram of a screening template provided in an embodiment of this application;

DETAILED DESCRIPTION OF THE EMBODIMENTS

The technical schemes in the embodiments of this application will be clearly and completely described in combination with the drawings in the embodiments of this application. Obviously, the embodiments described are only part of the embodiments of this application, but not all embodiments. Based on the embodiments in this application, all other embodiments obtained by a person skilled in the art without creative labor are within a protection scope of this application.

Figure 1:
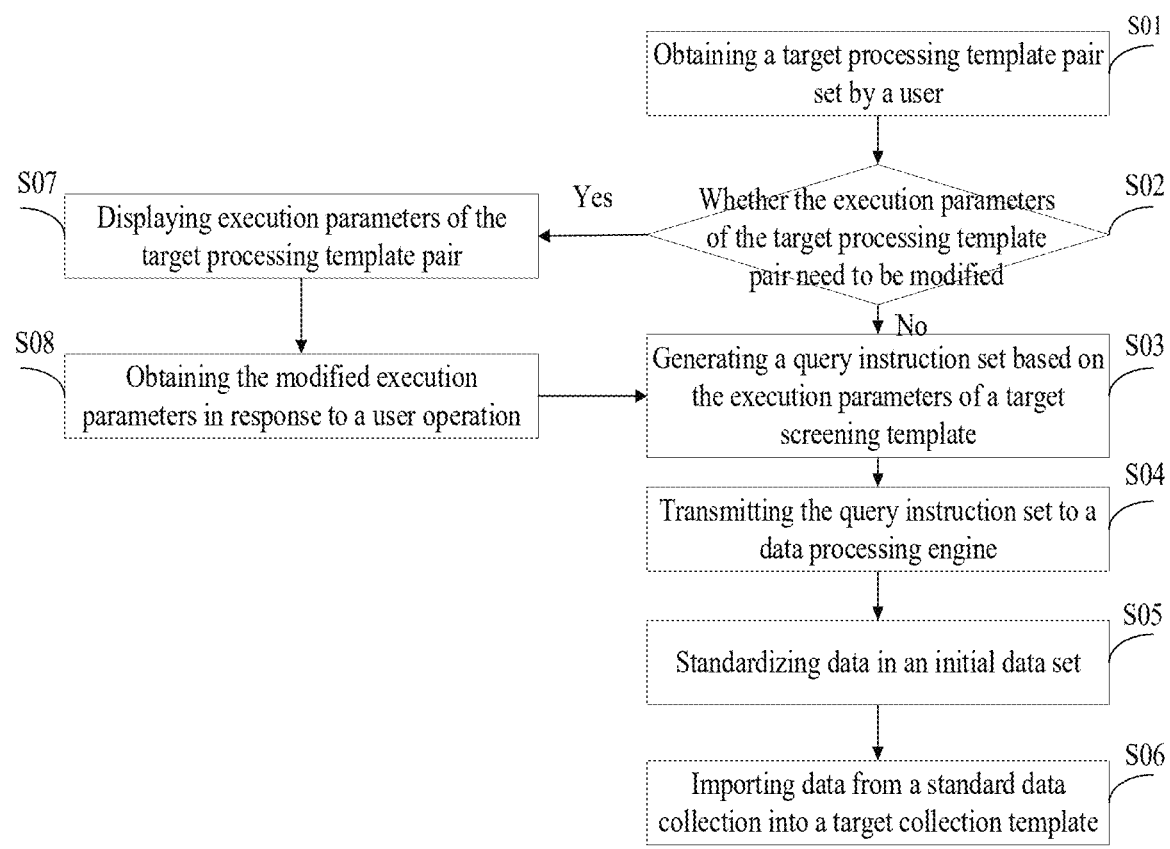
FIG. 1 is a flowchart of a method for processing complex data provided in an embodiment of this application.

First, a method for processing complex data provided by an embodiment of this application is introduced in combination with FIG. 1, as shown in FIG. 1. The method may comprise:

Step S01: obtaining a target processing template pair set by a user.

Specifically, the target processing template pair comprises a target collection template and a target screening template; the user can select the target collection template and target screening template from a collection template library and a screening template library according to a data structure and data relationship of data required by a current data processing task to acquire the target processing template pair. The collection template and the screening template are a general name of a series of data collection structures, and the collection template and screening template correspond one by one. If there is no target collection template or target screening template suitable for a current data processing task in the current collection template library or screening template library, the user can select a target data dictionary according to the data to be processed by the current data processing task and enter execution parameters of the template. Based on the target data dictionary and the execution parameters entered by the user, the target collection template and target screening template are generated for the current data processing task.

The user can select the target data dictionary by a manner such as dragging, clicking to check, double-clicking, or entering. The collection template and screening template which can collect a structure in the target data dictionary are automatically generated according to the data structure in the target data dictionary. As shown in FIG. 2 and FIG. 3, the target data dictionary can be selected by a manner of dragging. The target data dictionary is dragged to a design area of the collection template and the screening template. After dragging the target data dictionary to the design area, the collection template and the screening template which can collect the data structure in the target data dictionary can be automatically generated according to the data structure in the target data dictionary. Each block in the collection template and the screening template stores a separate data structure. After designing the collection template and the screening template, the completed collection template and screening template can be automatically stored to the collection template library and screening template library respectively. The collection templates and the screening templates stored in the collection template library and the screening template library can be exported and copied for subsequent use. By exporting, existing collection templates and screening templates may be exported to different systems for users of the systems to use; and if data structures which need the data processing are similar, the user can directly copy an existing collection template and a screening template and use them directly or after fine-tuning. In addition, through a parameter setting area, execution parameters of the collection template and the screening template may be designed according to a research background, wherein the execution parameters comprise execution times, an execution period, a screening condition, a template attribute, a data indicator, and so on.

The screening template and the collection template can specify one or more target data sources for screening among pre-connected data sources through the parameter setting area. The data source may be a database, an interface, and so on. The screening template library and the collection template library may be a memory, a database, a file and other storage media.

The target data dictionary may be an industry data dictionary (such as medical care, education) directly imported by the user or a data dictionary preset by the system. The industry data dictionary records features and relationships of industry data. Or through a pre-trained data processing model, unstructured data in a data set imported by the user (Excel, CVS, PDF, etc.) is used to generate collated SQL statements by a large model technology, and the generated collated SQL statements are executed to complete collation to acquire a data dictionary generated according to the unstructured data in the data set input by the user.

Step S02: determining whether the execution parameters of the target processing template pair need to be modified.

Specifically, different research backgrounds lead to different data to be processed by the screening template and collection template. The execution parameters in the target screening template and the target collection template may need to be modified according to the current data processing task. Therefore, based on the template attributes of the collection template and the screening template, it can be determined whether the execution parameters of the target collection template and the target screening template need to be modified according to the current data processing task.

If not, the following step S03 is performed; and if so, the following step S07 is performed.

Step S03: generating a query instruction set based on the execution parameters of the target screening template.

Specifically, a screening condition in the target screening template may be parsed to generate a query instruction set according to the screening condition. The query instruction set comprises at least one query instruction. The screening condition comprises an operator such as "greater than", "equal to", "less than", "greater than or equal to", "less than or equal to" and a boundary value, and a conditional relation symbol such as "and", "or". For example, if the screening condition is for a patient whose weight is less than 50 kg and height is greater than 170 m, a corresponding query instruction set is generated according to the screening condition. If it is necessary to monitor a blood glucose level of a diabetic patient before taking medication, three days after taking the medication, and five days after taking the medication, a query instruction set may be generated according to the screening condition.

Step S04: transmitting the query instruction set to the data processing engine.

Figure 4:
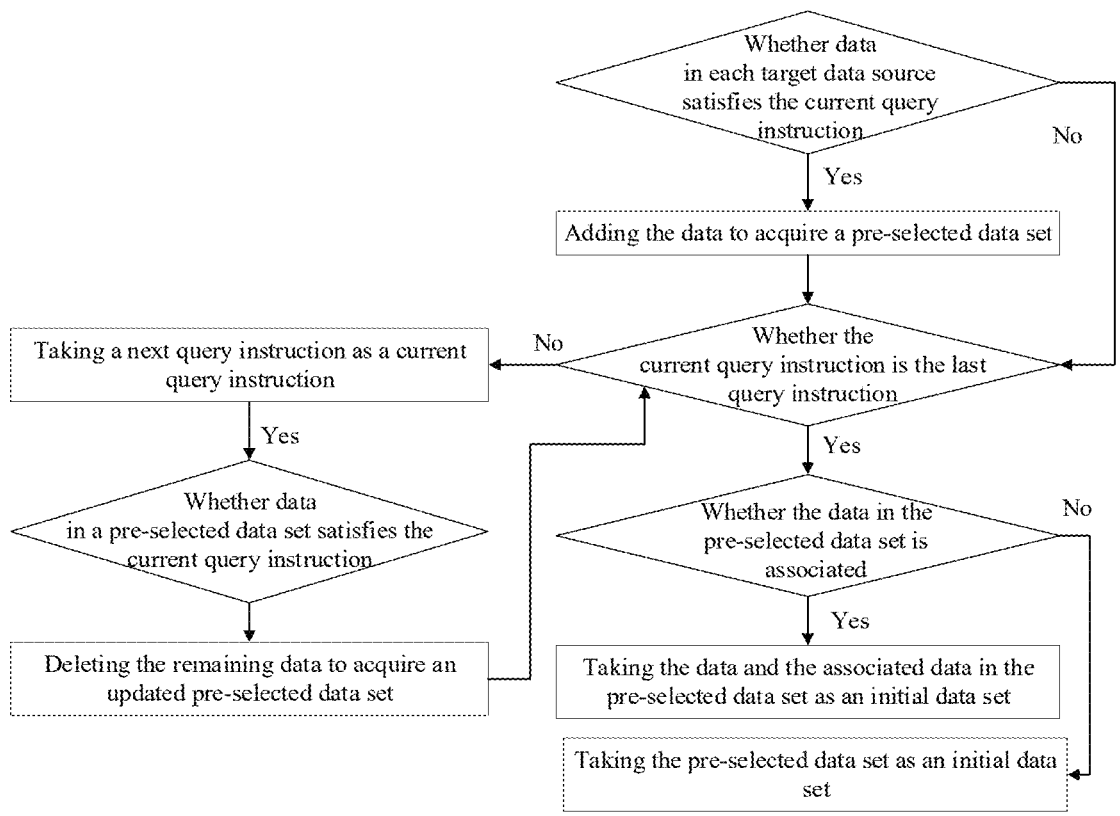
FIG. 4 is a flowchart of data screening provided in an embodiment of this application.
Figure 5:
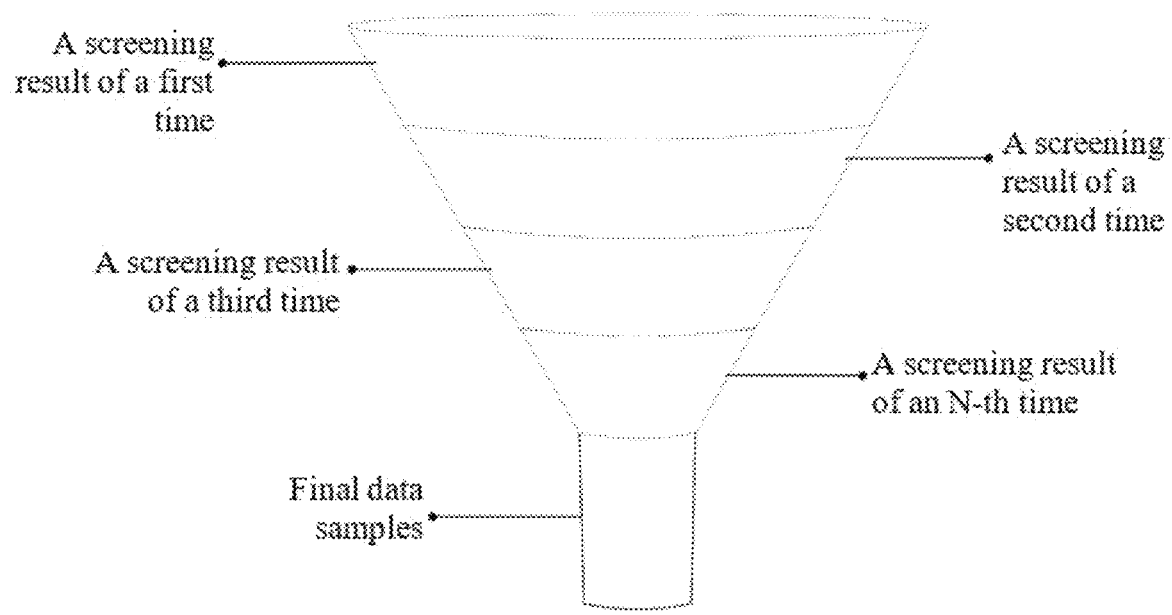
FIG. 5 is a schematic diagram of data screening provided in an embodiment of this application.

Specifically, after the query instruction set is generated, the query instruction set may be transmitted to the data processing engine connected to each target data source. After receiving the query instruction set, the data processing engine may utilize the screening condition in the query instruction set. As shown in FIG. 4 and FIG. 5, the data processing engine executes a query instruction in the query instruction set to screen within a previous screening result. When the last query instruction is executed, final data samples after N times of screening, that is, a final pre-selected data set, may be acquired. The data processing engine may determine whether each piece of data in each target data source satisfies a current query instruction; and if the data in the target data source satisfies the current query instruction, then the data may be added to the pre-selected data set to acquire the pre-selected data set. If the current query instruction is not the last query instruction, a next query instruction may be taken as a new current query instruction and it is determined whether each piece of data in the pre-selected data set satisfies the current query instruction, and the remaining data in the pre-selected data set that does not satisfy the current query instruction is deleted to acquire an updated pre-selected data set, and the step of determining whether the current query instruction is the last query instruction is returned to and executed; if the current query instruction is the last query instruction, it is determined whether there is a connection relationship among each piece of data in the pre-selected data set; if there is a connection relationship, the data in the pre-selected data set and associated data having a connection relationship with the pre-selected data set are taken as the data in the initial data set; and if there is no connection relationship, the pre-selected data set is taken as the initial data set. The connection relationship among the data may be determined by a primary foreign key, a field name, connotation meaning of the data or a domain model imported in advance, and then the screening is carried out according to the connection relationship among the data.

Step S05: normalizing the data in the initial data set.

Specifically, storage standards of the data stored in different target data sources are different, resulting in different numerical units and numerical digits of the data. Therefore, in order to better process the data, the data in the initial data set may be standardized according to a unified standard. The data in the initial data set may be standardized with a unified standard through a data processing model to acquire a standard data set. For example, the data processing model may standardize the data in the initial data set according to industry regulations.

Step S06: importing the data in the standard data set into the target collection template.

Specifically, the data in the standard data set is filled into a corresponding position in the target collection template to acquire the target data set. For example, when the indicator monitoring is carried out, data to be monitored needs to be obtained, and the retrieved data to be monitored is filled in the target collection template to monitor the data in the target data set.

Step S07: displaying the execution parameters of the target processing template pair.

Specifically, if the execution parameters of the target processing template pair are modified, the execution parameters of the target collection template and the target screening template of the target processing template pair may be displayed for the user to modify.

Step S08: in response to an operation of the user, obtaining the modified execution parameters.

Specifically, in response to an operation of the user to modify the execution parameters of the target processing template pair according to the research background, the execution parameters of the target processing template pair are modified to acquire the updated target processing template pair. Then, the above step S03 may be performed based on the updated target processing template.

Further, an execution order among step S06, step S07 and step S08 may be set according to the requirements of a research scenario.

The method for processing complex data provided in the embodiment of this application comprises generating a query instruction set based on the execution parameters of the target screening template; transmitting the query instruction set to the data processing engine so that the data processing engine obtains data from each target data source based on the query instruction set to acquire the initial data set; standardizing the data in the initial data set through the data processing model to acquire the standard data set; and importing the data from the standard data set into the target collection template to acquire the target data set. In the method for processing complex data in the embodiment of this application, the data processing engine can be connected with each data source; the data processing engine obtains, from each target data source, the data that satisfies a screening condition of the target screening template based on the query instruction set; and a pre-trained data processing model can standardize data from different target data sources and import the standardized data into a collection template A worker only needs to set the corresponding collection template and screening template according to a research scenario, and there is no need for the worker to develop a software according to the research scenario, which reduces preliminary preparation time, decreases a data processing cost and improves the efficiency of the data processing. In addition, for similar data processing tasks, the worker only needs to copy the template in the template library and fine-tune it. Multiple times of reuse of the template can further reduce the cost of the data processing and improve the efficiency of the data processing.

If the research scenario requires, the collected data is analyzed. In the method for processing complex data provided by the embodiment of this application, in step S06, after importing data from the standard data set into the target collection template, the following may also be performed: determining whether the current data processing requires the data analysis.

Specifically, the user may set it up according to the research requirements. If the data analysis is required, the user may select an option that means performing the data analysis; and if not, the user may select an option that means no data analysis. It may be determined whether the current data processing requires the data analysis by determining the option selected by the user.

If the data analysis is required, the data in the target data set is analyzed, and a data analysis report is generated according to a target analysis template pre-set by the user to acquire the data analysis report.

Specifically, the data in the target data set is analyzed to acquire the analysis report of the data. The target analysis report template may be an analysis template customized by the user according to the current data processing task, or an analysis template selected by the user from the analysis template library according to the current data processing task.

Figure 6:
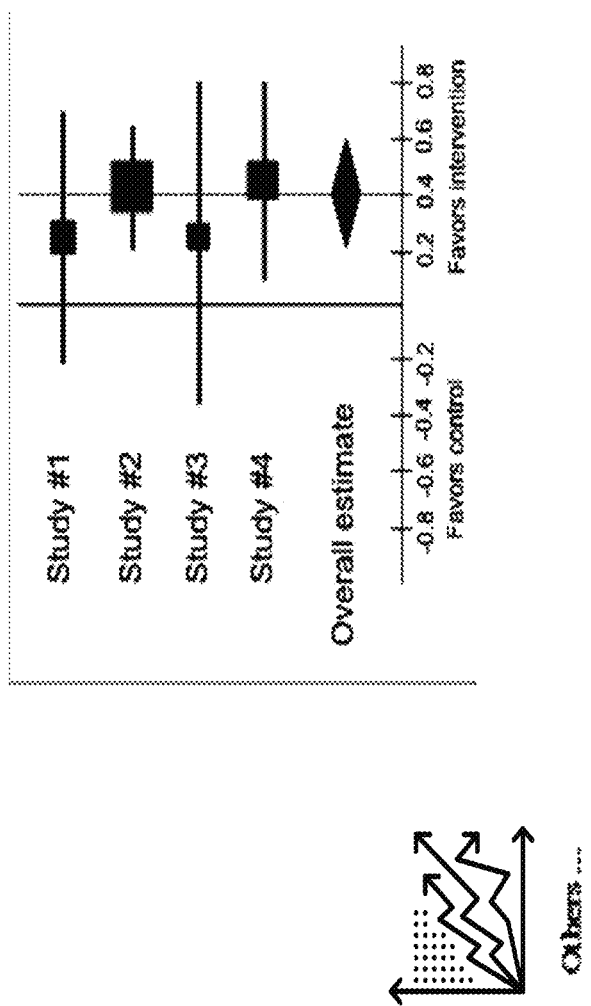
FIG. 6 is a design schematic diagram of an analysis template provided in an embodiment of this application.

If there is no analysis template suitable for the current data processing task in the current analysis template library, the user may design a target analysis template for the current data processing task according to the data to be processed by the current data processing task. The user may select a representation of the analysis template by a manner such as dragging, clicking to check, double-clicking, or entering as required. The representation of the analysis template includes various types of charts, such as a forest graph, a box graph, a funnel graph, a bubble graph, an ROC curve graph, a curve graph, and a bar graph. As shown in FIG. 6, a style of a desired analysis template may be dragged to the design area, and a horizontal coordinate, a vertical coordinate and other related parameters of the analysis report are set through the parameter setting area to generate the target analysis template for the current data processing task.

In addition, the user may also store the generated target analysis template into the analysis template library according to research requirements for export and copy for subsequent use in a subsequent research. The analysis template may be a memory, a database, a file and other storage media.

In the method for processing complex data provided by an embodiment of this application, when the research scenario requires data analysis, the user may set whether to perform the data analysis according to the research requirements. The analysis report may be generated according to the target analysis template set by the user. Because the target analysis template is set by the user according to the current data processing task, the generated analysis report is more closely related to the current data processing task.

In the method for processing complex data provided in the embodiment of this application, in step S06, after importing the data in the standard data set into the target collection template, the following step may further be performed:
determining whether the data in the target data set requires manual confirmation.

Specifically, it can be determined whether the data in the target data set requires manual confirmation by determining whether the user chooses an option of manual confirmation.

If so, the target data set is displayed; and if not, all data in the original target data set is retained.

Specifically, if the manual confirmation is required, the target data set is displayed so that the user can see the data in the target data set and select the required data.

In response to an operation of selecting data by the user, data not selected by the user is deleted to acquire a target data set confirmed by the user.

Specifically, in response to the operation of selecting data by the user, data selected by the user is retained, and the data not selected by the user is deleted to acquire a confirmed target data set.

The method for processing complex data provided by the embodiment of this application may require the user to confirm the data in the screened target data set. The user may delete expired data and invalid data to acquire a more accurate target data set. A more accurate analysis report is acquired by analysis of the data in the target data set.

In the method for processing complex data provided by the embodiment of this application, after importing the data in the standard data set into the target collection template in step S06, the following step may also be performed:
adding one to the current number of executions of the current data processing task to acquire the updated current number of executions.

Specifically, after the current data processing task is executed once, the current execution times of the target collection template and target screening template of the current data processing task may be added by one to acquire the current execution times of updating the target collection template and the target screening template.

In the method for processing complex data provided by the embodiment of this application, the user may understand the usage of the target collection template and target screening template according to the current execution times of the target collection template and the target screening template.

Consider that some researches require real-time monitoring of the data, in the method for processing complex data provided by the embodiment of this application, after importing the data in the standard data set into the target collection template in step S06 is completed, the following step may further be performed:

based on the execution parameters of the target processing template pair, determining whether the current data processing task needs to be executed periodically.

Specifically, it may be determined whether the current data processing task needs to be executed periodically by determining whether the target processing template pair has an execution period. If the target processing template pair has the execution period, it indicates that the current data processing task needs to be executed periodically; and if no execution period exists in the target processing template pair, it indicates that the current data processing task does not need to be executed periodically.

If no, the current data processing task does not need to be performed; and if so, the following steps are performed:

obtaining the execution period of the target processing template pair; and calculating target time of a next execution of the current data processing task based on the execution period and the current time.

The current data processing task is stored as a scheduled task for an execution of step S03 of generating the query instruction set based on the execution parameters of the target screening template at the target time.

In the method for processing complex data provided in the embodiment of this application, the data may be monitored in real time by setting the execution period and executing the data processing task according to the execution period. Moreover, the user does not need to perform other operations, which improves the efficiency of data processing.

In addition, in the method for processing complex data provided by the embodiment of this application, after importing data from the standard data set into the target collection template in step S06, it may also be determined whether the current data processing task needs to be executed periodically by determining whether the execution time is set for the target collection template and the target screening template of the target processing template pair.

If necessary, the current data processing task is stored as a scheduled task for an execution of step S03 of generating the query instruction set based on the execution parameters of the target screening template at the target time. In this case, the target time is execution time set by the target collection template and the target screening template in the target processing template pair.

Considering that the use of research data is subject to strict security control requirements, in the method for processing complex data provided in the embodiment of this application, after analyzing the data in the target data set, it further comprises:

generating the operation report.

Specifically, after acquiring the analysis report, the operation report of the operation may be generated. The operation report may comprise the target data set, the analysis report, the operation time, etc.

The operation report is stored.

It is determined whether to export the operation report.

Specifically, it may be determined whether to export the operation report by determining whether the user chooses to export the operation report.

If the operation report is exported, it is determined whether the user has an export permission.

If the user has the export permission, the operation report is exported.

In the method for processing complex data provided in the embodiment of this application, the operation report of this operation may be generated and stored for subsequent research based on the operation report. In addition, before exporting an operation report, the permission of the user is verified, and if the user has the permission, the operation report may be exported according to the exporting operation of the user. It may better protect data from leakage.

It should be understood that the various steps described in the method embodiments disclosed in this application may be performed in a different order and/or in parallel. In addition, the method embodiments may comprise an additional step and/or omit a shown step. The scope of disclosure of this application is not limited in this respect.

An embodiment of the present application also provides a storage medium storing a program suitable for execution by a processor, and the program is used to implement each processing flow in the above schemes for processing complex data.

Finally, it should be noted that in this application, relational terms such as first and second are used only to distinguish one entity or operation from another entity or operation, which does not necessarily require or imply any such actual relationship or order among these entities or operations. Furthermore, a term "comprise", "contain" or any other variation thereof is intended to cover non-exclusive inclusion, so that a process, method, article or device comprising a set of elements includes not only those elements but also other elements not expressly listed, or an element inherent to such process, method, article or device. In the absence of further restrictions, an element qualified by the sentence "comprises a . . . " does not preclude existence of an additional identical element in a process, method, article or device comprising the element.

Each embodiment in this specification is described in a progressive manner, and each embodiment focuses on its differences from other embodiments. The same and similar parts of each embodiment can be referred to each other.

The above description of the disclosed embodiments enables a person skilled in the art to implement or use this application. Various modifications to these embodiments would be apparent to a person skilled in the art, and the general principles defined herein may be implemented in other embodiments without departing from the spirit or scope of this application. Therefore, the application is not limited to these embodiments shown herein, but conforms to the broadest scope consistent with the principles and novel features disclosed herein.

What is claimed is:

1. A method for processing complex data, comprising:
obtaining a target processing template pair set by a user, wherein the target processing template pair comprises a target collection template and a target screening template; and the target collection template and the target screening template are a collection template and a screening template generated by the user according to a current data processing task, or a collection template and a screening template selected by the user from a collection template library and a screening template library according to the current data processing task;
determining whether execution parameters of the target processing template pair need to be modified;
if not, generating a query instruction set based on the execution parameters of the target screening template;

transmitting the query instruction set to a data processing engine, so that the data processing engine obtains data from each target data source based on the query instruction set to acquire an initial data set, wherein the query instruction set comprises at least one query instruction, and the target data source is one or more data sources specified among pre-connected data sources;

standardizing the data in the initial data set through a data processing model to acquire a standard data set; and importing the data in the standard data set into the target collection template to acquire a target data set, wherein a process of generating the target collection template and the target screening template by the user according to the current data processing task comprises:

generating the target collection template and the target screening template for the current data processing task based on a target data dictionary and the execution parameters input by the user, wherein the target data dictionary is an industry data dictionary imported by the user or a data dictionary generated by the pre-trained data processing model through data organization of unstructured data in a data set imported by the user; and a process of obtaining data from each target data source by the data processing engine based on the query instruction set comprises:

determining whether each piece of data in each target data source satisfies a current query instruction; and if the data in the target data source satisfies the current query instruction, adding the data to a pre-selected data set;

determining whether the current query instruction is the last query instruction;

if the current query instruction is not the last query instruction, taking a next query instruction as a new current query instruction and determining whether each piece of data in the pre-selected data set satisfies the current query instruction, and deleting the remaining data in the pre-selected data set that does not satisfy the current query instruction to acquire an updated pre-selected data set, and returning to execute the step of determining whether the current query instruction is the last query instruction; and if the current query instruction is the last query instruction, determining whether there is a connection relationship among each piece of data in the pre-selected data set; if there is a connection relationship, taking the data in the pre-selected data set and associated data having a connection relationship with the pre-selected data set as the data in the initial data set; and if there is no connection relationship, taking the pre-selected data set as the initial data set.

2. The method for processing complex data according to claim 1, further comprising:

storing the generated target collection template and target screening template respectively in the collection template library and the screening template library for export and copy by the user for subsequent use.

3. The method for processing complex data according to claim 1, wherein after determining whether execution parameters of the target processing template pair need to be modified, the method further comprises:

if so, displaying the execution parameters of the target processing template pair; and in response to an operation of the user, obtaining the modified execution parameters so as to acquire an updated target processing template pair.

4. The method for processing complex data according to claim 1, wherein after importing the data in the standard data set into the target collection template, the method further comprises:

determining whether the data in the target data set requires manual confirmation;

if so, displaying the target data set; and in response to an operation of selecting data by the user, deleting data not selected by the user to acquire a target data set confirmed by the user.

5. The method for processing complex data according to claim 1, further comprising:

adding one to the current number of executions of the current data processing task to acquire the updated current number of executions.

6. The method for processing complex data according to claim 1, further comprising:

based on the execution parameters of the target processing template pair, determining whether the current data processing task needs to be executed periodically;

if so, obtaining an execution period of the target processing template pair;

calculating target time of a next execution of the current data processing task based on the execution cycle and the current time; and storing the current data processing task as a scheduled task for an execution of the step of generating the query instruction set based on the execution parameters of the target screening template at the target time.

7. The method for processing complex data according to claim 1, further comprising:

determining whether current data processing requires data analysis;

if so, analyzing the data in the target data set, and generating a data analysis report according to a target analysis template pre-set by the user to acquire the data analysis report, wherein the target analysis template is an analysis template generated by the user according to the current data processing task, or an analysis template selected by the user from the analysis template library according to the current data processing task.

8. The method for processing complex data according to claim 7, further comprising:

generating an operation report that comprises at least one of the target data set and the analysis report; and storing the operation report.

9. The method for processing complex data according to claim 8, wherein after generating the operation report, the method further comprises:

determining whether to export the operation report;

if the operation report is exported, determining whether the user has an export permission; and if the user has the export permission, exporting the operation report.

* * * * *